Figure 1:
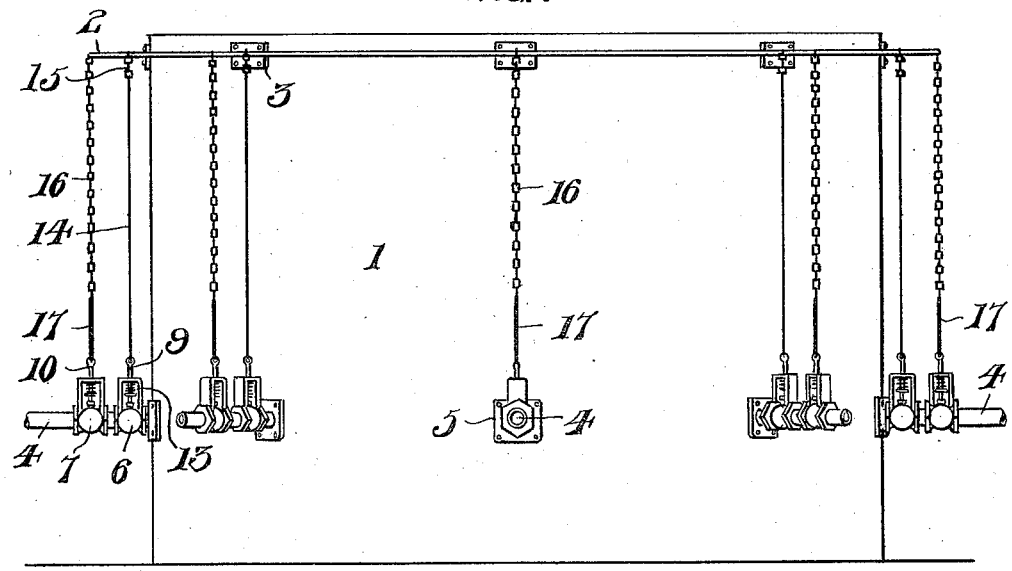

L. D. OWREY.
AUTOMATIC OIL RELEASE.
APPLICATION FILED SEPT. 25, 1912.

1,062,411.

Patented May 20, 1913.

WITNESSES

INVENTOR
Lute D. Owrey
By
ATTORNEYS

UNITED STATES PATENT OFFICE.

LUTE D. OWREY, OF PITTSBURGH, PENNSYLVANIA.

AUTOMATIC OIL-RELEASE.

1,062,411.  Specification of Letters Patent.  Patented May 20, 1913.

Application filed September 25, 1912. Serial No. 722,292.

*To all whom it may concern:*

Be it known that I, LUTE D. OWREY, a citizen of the United States of America, residing at Pittsburgh, in the county of Allegheny and State of Pennsylvania, have invented certain new and useful Improvements in Automatic Oil-Releases, of which the following is a specification, reference being had therein to the accompanying drawing.

This invention relates to an automatic oil release for oil tanks and other storage receptacles, and the primary object of my invention is to furnish an oil tank with automatic means for releasing high grade oil from the tank, should the tank catch fire or be in a dangerous position relatively to an adjacent burning structure.

Another object of this invention is to furnish an oil tank with outlet pipes that are equipped with automatic valves, one of which is normally closed and the other normally open, the former being automatically opened to release high grade oil and the latter automatically closed to prevent the escape of a residue, low grade or inferior quality of oil.

A further object of this invention is to accomplish the above results by an automatically operated device that is applicable to various types of receptacles containing inflammable and dangerous liquids that are liable to explode when a fire occurs.

With the above and other objects in view the invention resides in the novel construction, combination and arrangement of parts to be hereinafter specifically described and then claimed.

Reference will now be had to the drawing, wherein:—

Figure 2:
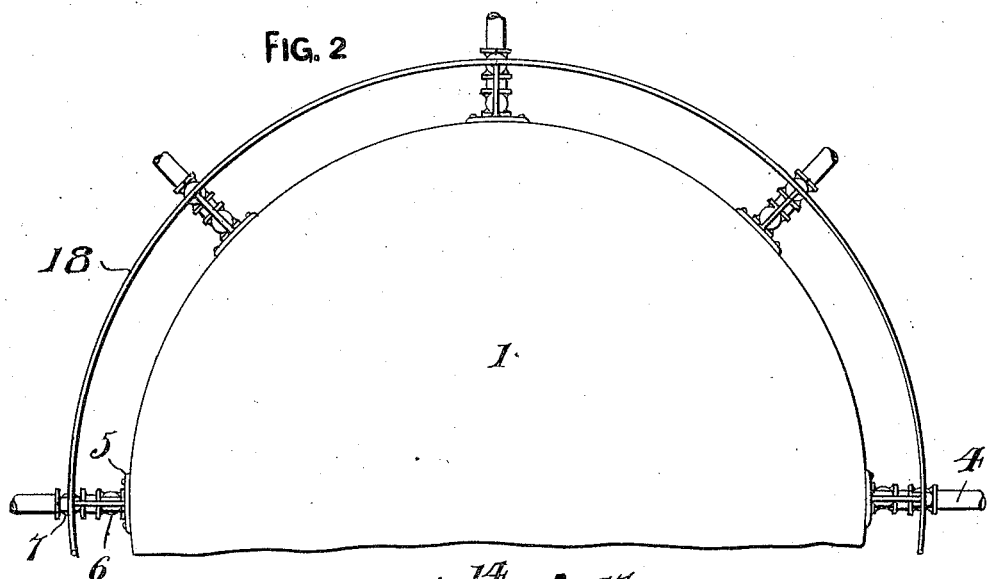
Figure 3:
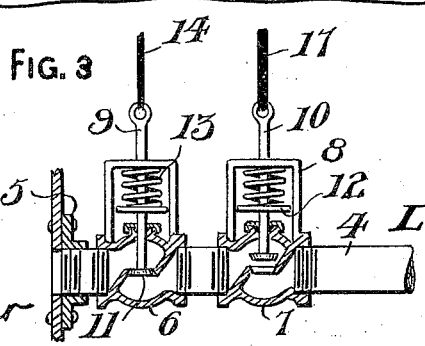

Figure 1 is a side elevation of an oil tank provided with the device, Fig. 2 is a plan of a portion of the same, and Fig. 3 is an enlarged longitudinal sectional view of valves controlling the release of oil.

Further describing my invention in detail with reference to the accompanying drawing, wherein like numerals denote corresponding parts throughout: 1 denotes a tank, reservoir or other receptacle containing inflammable or dangerous liquid. The side walls of the tank, at the top thereof, are provided with outriggers or brackets 2 that are riveted or otherwise connected to the tank, as at 3.

4 denotes outlet pipes connected to the tank 1, adjacent to the bottom thereof, as at 5, said outlet pipes being located directly beneath the outriggers or brackets 2. Each outlet pipe has a release valve body 6 and a shut off valve body 7, said valve bodies having guide yokes 8 for valve stems 9 and 10 that extend into the valve bodies 6 and 7 respectively. The valve stems 9 and 10 are provided with valves 11 within the valve bodies and the heads 12 within the yokes 8. Encircling the valve stems 9 and 10, between the yokes 8 and the heads 12 are coiled compression springs 13 adapted to automatically shift the valve stems 9 and 10, when released. The valve stem 9 is connected to the outrigger or bracket by a very sensitive soft metal fuse 14 and a short chain 15. The valve stem 10 is connected to the same outrigger or bracket by a long chain 16 and a soft metal fuse 17, said fuse having greater lasting qualities than the sensitive fuse 14, whereby the sensitive fuse will be burned out or give way somewhat prior to the destruction of the fuse 17. It is therefore apparent that in case of fire the valve body 6 is opened to release oil from the tank 1, the better grade of oil escaping. Eventually the fuse 17 is burned out and the valve body 7 closed, thereby preventing the escape of residue, low grade or an inferior oil.

By reference to Figs. 1 and 2 it will be observed that a plurality of the automatic release devices is used and to brace the outriggers or brackets 2, said outriggers are connected by a ring 18.

It is thought that the operation and utility of the device will be apparent without further describing my invention, and while in the drawings there is illustrated a preferred embodiment of the invention, it is to be understood that the structural elements are susceptible to such variations and modifications as fall within the scope of the appended claims.

What I claim is:

1. The combination with an oil tank having release pipes, of normally closed and normally open spring actuated valves in connection with each release pipe, and fuses in proximity to said valves and adapted to be burned out to permit of an automatic operation of said valves.

2. The combination with an oil tank having release pipes, of normally closed and normally open valves carried by each release pipe, fuses maintaining said valves normally closed and normally open, and means for automatically operating said valves when said fuses are burned out.

3. The combination with an oil tank having a release pipe, of normally closed and normally open valves carried thereby, spring actuated valve stems in connection with said valves, and fuses connected to said valve stems and adapted to be burned out to release said stems.

4. In an automatic release for oil tanks, an oil tank, release pipes in proximity to the bottom thereof, spring actuated valves carried by each release pipe, and fusible means in connection with said tank and said valves for retaining one of said valves normally open and the other of said valves normally closed.

5. In an automatic release for oil tanks, a tank, release pipes adjacent to the bottom thereof, valves carried by each pipe, spring actuated valve stems in connection with said valves, outriggers carried by said tank, and fuses connected to said valve stems and supported by said outriggers and adapted to be burned out to automatically release said valve stems.

In testimony whereof I affix my signature in the presence of two witnesses.

LUTE D. OWREY.

Witnesses:
MAX H. SROLOVITZ,
KATHERINE ERRETT.

Copies of this patent may be obtained for five cents each, by addressing the "Commissioner of Patents, Washington, D. C."